US010969622B2

(12) United States Patent
Day et al.

(10) Patent No.: US 10,969,622 B2
(45) Date of Patent: Apr. 6, 2021

(54) MULTI-ELEMENT BACKLIGHT TO HIGHLIGHT OR OBSCURE INFORMATIONAL ELEMENT

(71) Applicant: NCR Corporation, Duluth, GA (US)

(72) Inventors: Phil Noel Day, Fife (GB); Donald Iain MacInnes, Angus (GB); Steve Swaine, Perth (GB)

(73) Assignee: NCR Corporation, Atlanta, GA (US)

( * ) Notice: Subject to any disclaimer, the term of this patent is extended or adjusted under 35 U.S.C. 154(b) by 47 days.

(21) Appl. No.: 15/879,712

(22) Filed: Jan. 25, 2018

(65) Prior Publication Data

US 2019/0227381 A1 Jul. 25, 2019

(51) Int. Cl.
| | |
|---|---|
| *G02F 1/13357* | (2006.01) |
| *G06F 3/041* | (2006.01) |
| *G09G 3/34* | (2006.01) |
| *H05B 45/10* | (2020.01) |
| *H05B 47/11* | (2020.01) |
| *G02F 1/1333* | (2006.01) |

(52) U.S. Cl.
CPC .... *G02F 1/133603* (2013.01); *G02F 1/13338* (2013.01); *G06F 3/0412* (2013.01); *G09G 3/3406* (2013.01); *H05B 45/10* (2020.01); *H05B 47/11* (2020.01); *G02F 2001/133601* (2013.01)

(58) Field of Classification Search
CPC ........... G02F 1/133603; G02F 1/13338; G06F 3/0412; H05B 33/0845; H05B 37/0218
See application file for complete search history.

(56) References Cited

U.S. PATENT DOCUMENTS

| | | | | |
|---|---|---|---|---|
| 8,110,997 | B2 * | 2/2012 | Muramatsu | H05B 45/37 315/185 R |
| 2006/0238517 | A1 * | 10/2006 | King | G06F 1/1626 345/173 |
| 2011/0014955 | A1 * | 1/2011 | Kim | G02F 1/133603 455/566 |
| 2011/0109569 | A1 * | 5/2011 | Cheng | G09G 3/342 345/173 |
| 2012/0303548 | A1 * | 11/2012 | Johnson | G06Q 40/04 705/36 R |
| 2013/0135243 | A1 * | 5/2013 | Hirsch | H01H 13/83 345/173 |
| 2018/0180942 | A1 * | 6/2018 | Peterson | G02F 1/133603 |

* cited by examiner

*Primary Examiner* — Charles V Hicks
(74) *Attorney, Agent, or Firm* — Schwegman, Lundberg & Woessner

(57) ABSTRACT

A multi-pixel display panel can display an image that includes an informational element. A multi-element backlight panel can backlight the display panel. A controller coupled to the display panel and the backlight panel can control the backlight panel to illuminate the informational element more brightly or more dimly than portions of the image away from the informational element. In some examples, the controller can illuminate personal information more dimly than portions of the image away from the personal information, which can provide privacy for a user. In some examples, the controller can illuminate a prompt for a user action more brightly than portions of the image away from the prompt, which can call attention of the user to the prompt. In some examples, the controller can adjust an illumination level of at least a portion of the backlight panel in response to a sensed ambient light level.

20 Claims, 3 Drawing Sheets and not limitation in the figures of the accompanying

MULTI-ELEMENT BACKLIGHT TO HIGHLIGHT OR OBSCURE INFORMATIONAL ELEMENT

TECHNICAL FIELD

The present disclosure relates to a backlight for illuminating a display panel.

BACKGROUND

A publicly viewable display, such as a display on an automated teller machine, can raise privacy issues by showing personal information, such as a name, an address, an account number, or an account balance. In addition, for a user interface that includes multiple objects or a relatively large amount of information, a prompt for a user action can be difficult to discern on the display.

SUMMARY

In a first example, a system can include: a multi-pixel display panel configured to display an image that includes an informational element; a multi-element backlight panel configured to backlight the display panel; and a controller coupled to the display panel and the backlight panel, the controller configured to control the backlight panel to illuminate the informational element more brightly or more dimly than portions of the image away from the informational element.

In a second example, a method can include: displaying an image on a multi-pixel display panel, the image including an informational element; backlighting the display panel with a multi-element backlight panel; and controlling the backlight panel to illuminate the informational element more brightly or more dimly than portions of the image away from the informational element.

In a third example, a system can include: a multi-pixel display panel configured to display an image that includes an alphanumeric element; a multi-element backlight panel configured to backlight the display panel, the backlight panel including a two-dimensional array of independently controllable light emitting diodes, wherein a number of pixels in the multi-pixel display panel is greater than a number of light emitting diodes in the multi-element backlight panel; and a controller coupled to the display panel and the backlight panel, the controller configured to control the backlight panel to illuminate the alphanumeric element more brightly or more dimly than portions of the image away from the alphanumeric element.

BRIEF DESCRIPTION OF THE DRAWINGS

The present disclosure is illustrated by way of example and not limitation in the figures of the accompanying drawings, in which like reference numbers indicate similar elements.

Figure 1:
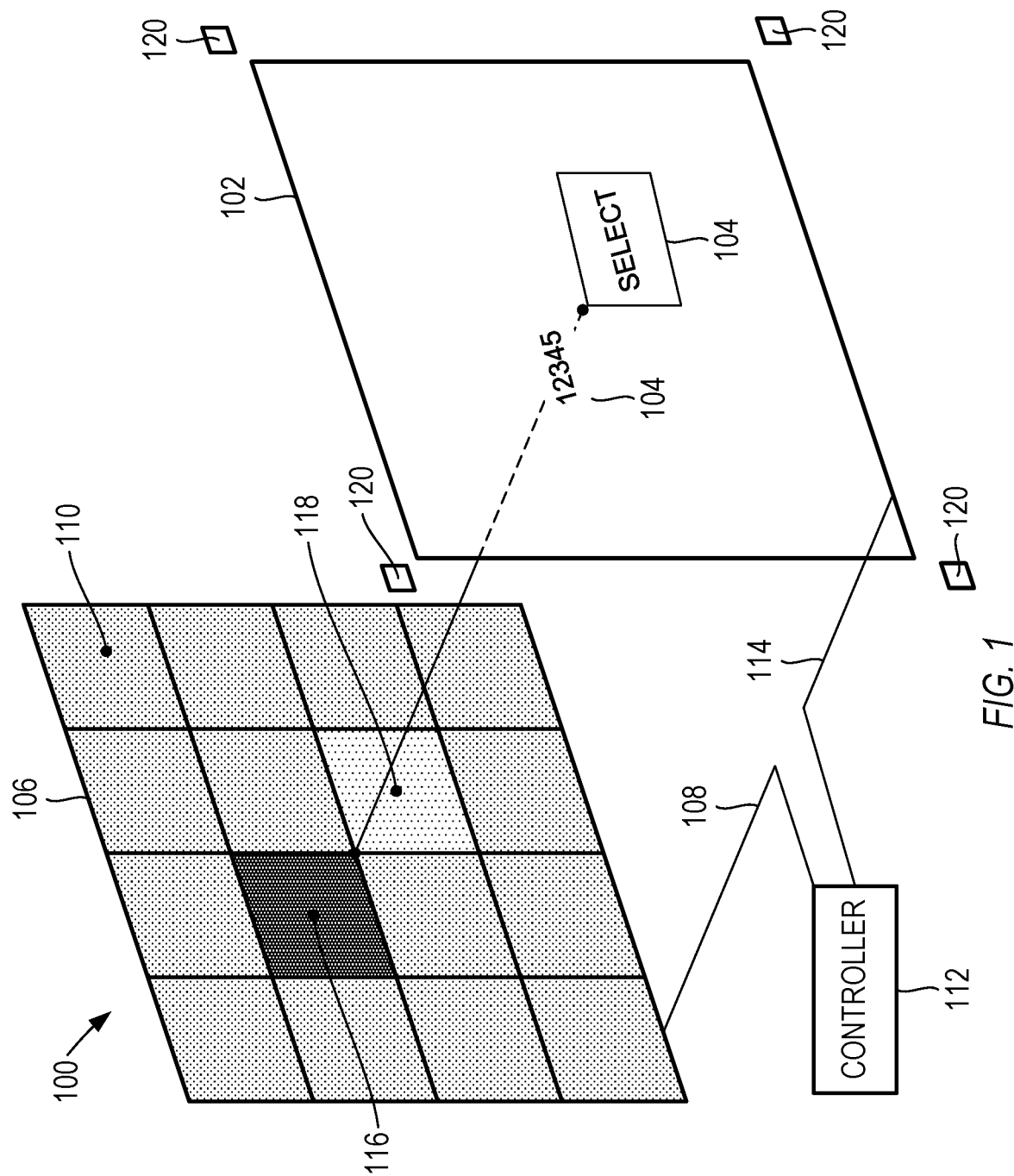
FIG. 1 shows an example of a system that can highlight or obscure an informational element displayed on a backlit display, in accordance with some embodiments.

It should be noted that elements in the drawings are not necessarily drawn to scale. The configurations shown in the drawings are merely examples, and should not be construed as limiting in any manner.

DETAILED DESCRIPTION

A multi-pixel display panel can display an image that includes an informational element. A multi-element backlight panel can backlight the display panel. A controller coupled to the display panel and the backlight panel can control the backlight panel to illuminate the informational element more brightly or more dimly than portions of the image away from the informational element. In some examples, the controller can illuminate personal information more dimly than portions of the image away from the personal information, which can provide privacy for a user. In some examples, the controller can illuminate a prompt for a user action more brightly than portions of the image away from the prompt, which can call attention of the user to the prompt. In some examples, the controller can adjust an illumination level of at least a portion of the backlight panel in response to a sensed ambient light level.

Highlighting or obscuring an informational element in such a manner could be difficult or impossible on a backlit display that uses uniform backlight illumination. In addition, using the backlight to highlight or obscure, rather than the display panel, can offer more flexibility in how strongly the informational element is highlighted or obscured. For example, a system can determine the level of highlighting or obscuring using only the video signal sent to the display panel as input, and can perform the highlighting or obscuring without affecting the video signal sent to the display panel. In addition, the system may be able to highlight the video signal beyond what is achievable through the display panel alone.

FIG. 1 shows an example of a system 100 that can highlight or obscure an informational element displayed on a backlit display, in accordance with some embodiments. In some examples, the system 100 can function as an automated teller machine. In other examples, the system 100 can function as any suitable device that can display and/or receive information through a backlit display. The configuration of FIG. 1 is but one example; other configurations can also be used.

The system 100 can include a multi-pixel display panel 102, which can display video and/or still images in response to an input electrical signal. In some examples, the multi-pixel display panel 102 can include a liquid crystal display panel, with each pixel of the liquid crystal display panel having a transmissivity that is controlled by an applied voltage. Other types of display panels can also be used. In some examples, the display panel 102 can be a color panel, with each pixel including color-specific sub-pixels that are dedicated to red light, green light, and blue light, or some other suitable color combination. In other examples, the display panel 102 can be monochromatic.

The multi-pixel display panel 102 can display an image that includes an informational element 104. Examples of informational elements can include an alphanumeric element, graphical content, an icon, or a combination of any or all of these. The informational element 104 can be static, such as a text prompt or an icon, or can be animated, such as in a video loop that shows instructions for a particular action.

In some examples, the informational element 104 discussed herein can raise privacy issues for a user. For example, the informational element 104 can include an alphanumeric element, such as a name, an address, an account number, an account balance, or one or more other suitable alphanumeric strings that could raise privacy issues for a user if displayed in public. As explained below, the system 100 can help obscure these privacy-related informational elements 104 by dimming the privacy-related informational elements 104.

In other examples, the informational element 104 discussed herein can request attention from a user. For example, the informational element 104 can be an alphanumeric and/or graphical prompt for an action by the user, such as requesting an input from the user, selecting a choice from a menu or clicking an approval choice. In some examples, for which the display panel 102 is touch-sensitive, the informational element 104 can be a prompt requesting that the user respond to the prompt on the touch-sensitive display panel 102. As explained below, the system 100 can help highlight these action-requesting informational elements 104 by increasing the brightness of the action-requesting informational elements 104.

A multi-element backlight panel 106 can backlight the display panel 102. Unlike common backlight panels, which typically provide illumination that is as uniform as possible, the multi-element backlight panel 106 can provide illumination that can be controllably varied from location to location over the panel area, in response to an input electrical signal 108. In practice, the multi-element backlight panel 106 can typically be positioned relatively close to the display panel 102; in FIG. 1 the backlight panel 106 and the display panel 102 are shown as being separated, for clarity.

In some examples, the backlight panel 106 can include several independently controllable areas 110, such as eight, sixteen, thirty-two, sixty-four, or another suitable number of independently controllable areas across the panel. In some examples, a number of pixels in the multi-pixel display panel 102 can be greater than a number of elements in the multi-element backlight panel 106, so that each backlight element or area 110 can illuminate multiple image pixels.

In some examples, the backlight panel 106 can include a two-dimensional array of independently controllable light emitting diodes. In some examples, the light emitting diodes can emit white light. In other examples, the light emitting diodes can each emit single-color light (such as red, green, or blue), and can be positioned in clusters to combine their single-color light to form multi-color light that appears as white to a human eye. In some examples, an optional diffuser (not shown) can be positioned between the backlight panel 106 and the display panel 102, which can diffuse light from the backlight panel 106 to make it appear more uniform at the display panel 102.

A controller 112 can couple to the display panel 102 and the backlight panel 106, by providing suitable input signals 108, 114 for the display panel 102 and the backlight panel 106. In some examples, the controller 112 can include circuitry that can receive and/or generate video signals or other input signals in a suitable format. The display panel 102 and the backlight panel 106 can receive the signals generated by the circuitry in the controller 112. In some examples, the controller 112 can generate a video signal 114 that can drive the display panel 102, can interpret the display panel's video signal 114 to identify one or more locations that include informational elements 104, can determine whether the informational element or elements 104 require an increase or a reduction in brightness, and can modify the driving signal 108 sent to the backlight panel 106 to illuminate the informational element or elements 104 more brightly or more dimly than portions of the image away from the informational element or elements 104.

In some examples, the circuitry can include a processor, memory, and instructions stored in the memory that can be executed on the processor. In some examples, the circuitry can include one or more dedicated processors or chips, which can execute instructions that are hard-wired into the processors or chips. In some examples, the circuitry can receive, process, and/or generate video signals. The circuitry can be self-contained within the controller 112 in a housing of the system 100, can be located on a server external to the housing and connected to the housing via a wireless or wired connection, or in a combination of internal and external locations.

The controller 112 can control the backlight panel 106 to illuminate the informational element 104 more brightly or more dimly than portions of the image away from the informational element 104.

For a specific example in which the system 100 dims an account balance on a screen, the circuitry in the controller 112 can identify an alphanumeric element in the video image that corresponds to the account balance, can identify that the account balance is personal information and should be dimmed, can determine what area of the video image is to be dimmed, can determine what area 116 of the backlight illumination is to be dimmed, and can send a driving electrical signal to the backlight panel 106 to cause the backlight panel 106 to dim in the suitable location.

For a specific example in which the system 100 prompts a user to select a choice on a touch screen, the circuitry in the controller 112 can identify the available choices, can identify how the choices are to be rendered on the display (such as text in a box, text in a list, a loop of video that shows how to perform a task, and so forth), can determine what area of the video image is to be highlighted, can determine what area 118 of the backlight illumination is to be brightened, and can send a driving electrical signal to the backlight panel 106 to cause the backlight panel 106 to brighten in the suitable location.

In some examples, the controller 112 can further control the backlight panel 106 to pulse the illumination of the informational element 104. Such a pulsing can draw the attention of a user. In some examples, the pulsing can include a ramp up to an elevated illumination level and a ramp down from the elevated illumination level.

In some examples, the system 100 can further include at least one sensor 120 configured to sense an ambient light level. The controller 112 can control the backlight panel 106 to adjust an illumination level of at least a portion of the backlight panel 106 in response to the sensed ambient light level. For example, the backlight level can be increased when the sensor 120 senses relatively bright sunlight, to improve visibility of the display. Similarly, the backlight level can be decreased when the sensor 120 senses relative darkness, such as at night. In some examples, the at least one sensor 120 can include a plurality of sensors positioned around a perimeter of the display panel. Multiple sensors can help determine which area(s) of the display are positioned in sunlight, and can help brighten only those sunlight-exposed area(s).

Figure 2:
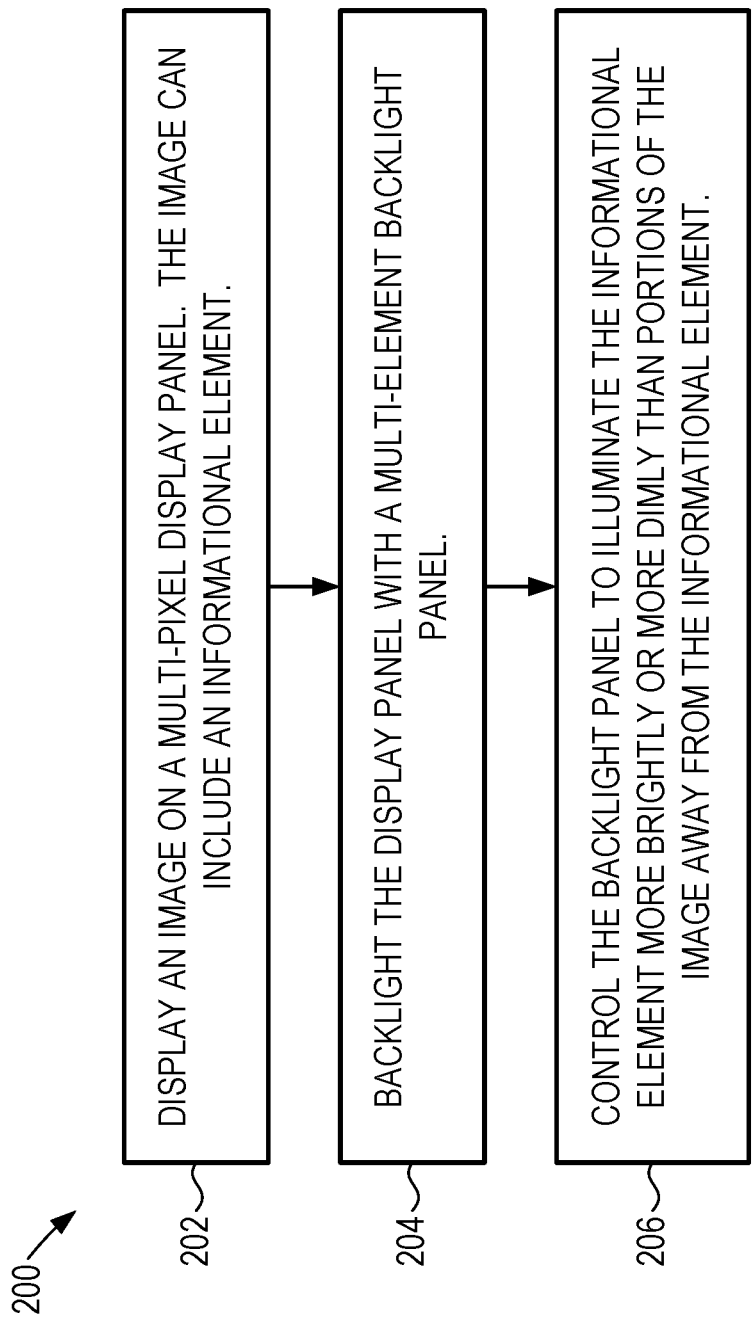
FIG. 2 shows an example of a method for highlighting or obscuring an informational element displayed on a backlit display, in accordance with some embodiments.

FIG. 2 shows an example of a method 200 for highlighting or obscuring an informational element displayed on a backlit display, in accordance with some embodiments. The method 200 can be executed by an automated teller machine, or by another suitable device that can include a backlit display, such as the system 100 of FIG. 1.

At operation 202, the device can display an image on a multi-pixel display panel. The image can include an informational element.

At operation 204, the device can backlight the display panel with a multi-element backlight panel.

At operation 206, the device can control the backlight panel to illuminate the informational element more brightly or more dimly than portions of the image away from the informational element.

In some examples, the informational element can include at least one of an alphanumeric element or a graphical element.

In some examples, the informational element can include an alphanumeric element. In some examples, the alphanumeric element can include personal information of a user. In some examples, the backlight panel can be controlled to illuminate the alphanumeric element more dimly than portions of the image away from the alphanumeric element.

In some examples, the display panel can be touch-sensitive. In some examples, the informational element can include a prompt that requests that the user respond to the prompt on the touch-sensitive display panel. In some examples, the backlight panel can be controlled to illuminate the informational element more brightly than portions of the image away from the informational element.

In some examples, the method 200 can further include sensing an ambient light level with a plurality of sensors positioned around a perimeter of the display panel. In some examples, the method 200 can further include controlling the backlight panel to adjust an illumination level of at least a portion of the backlight panel in response to the sensed ambient light level.

In some examples, a number of pixels in the multi-pixel display panel can be greater than a number of elements in the multi-element backlight panel. In some examples, the backlight panel can include a two-dimensional array of independently controllable light emitting diodes.

Figure 3:
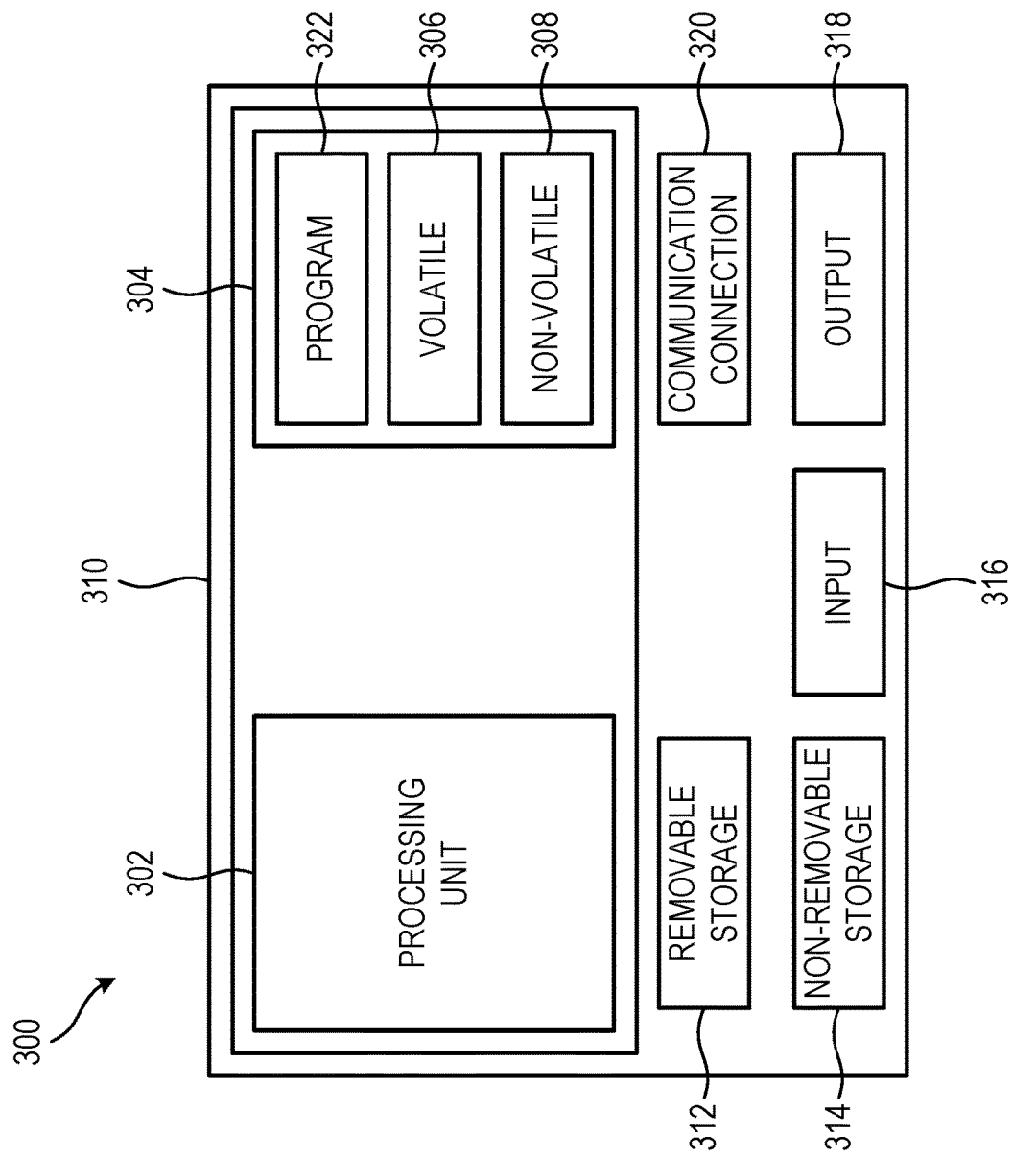
FIG. 3 shows a block diagram of an example of a terminal, such as an automated teller machine, in accordance with some embodiments.

FIG. 3 shows a block diagram of an example of a terminal 300, such as an automated teller machine, in accordance with some embodiments. The terminal 300 can include a system having a backlight panel, a display panel, and a controller, such as the example shown in FIG. 1. The example of FIG. 3 is but one configuration for a terminal; other configurations can also be used.

In one embodiment, multiple such terminals 300 are utilized in a distributed network to implement multiple components in a transaction based environment. An object-oriented, service-oriented, or other architecture may be used to implement such functions and communicate between the multiple terminals 300 and components.

One example of a terminal 300, in the form of a computer 310, can include a processing unit 302, memory 304, removable storage 312, and non-removable storage 314. Memory 304 may include volatile memory 306 and non-volatile memory 308. Computer 310 may include, or have access to a computing environment that includes, a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318 (e.g., including electrical signals that can drive the backlight panel and the display panel), and a communication connection 320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a non-transitory computer-readable medium. For example, a computer program 322 with instructions for the computer 310, according to the teachings of the present disclosure, may be included on a CD-ROM and loaded from the CD-ROM to a hard drive. The computer-readable instructions allow computer 310 to provide generic access controls in a COM based computer network system having multiple users and servers.

What is claimed is:

1. A system, comprising:
   a multi-pixel display panel configured to display an image that includes an informational element;
   a multi-element backlight panel configured to backlight the display panel;
   at least two sensors located around a perimeter of the display panel configured to determine whether an area of the display panel is positioned in sunlight; and
   a controller coupled to the display panel and the backlight panel, the controller configured to control the backlight panel to illuminate the informational element more brightly or more dimly than portions of the image away from the informational element, wherein to control the backlight panel includes to modify a driving signal sent to the backlight panel, such that during operation, the backlight panel has a first non-zero illumination level proximate the informational element and a second non-zero illumination level different from the first non-zero illumination level away from the informational element, wherein the illumination of the informational element includes to pulse the illumination of the informational element, wherein to pulse the illumination of the informational element includes at least one of a ramp up to an elevated illumination level or a ramp down from the elevated illumination level, and wherein upon a determination that an area of the display panel is positioned in sunlight, the controller is to brighten only the area of the display panel positioned in sunlight.

2. The system of claim 1, wherein the informational element includes at least one of an alphanumeric element or a graphical element.

3. The system of claim 2, wherein:
   the informational element includes an alphanumeric element;
   the alphanumeric element includes personal information of a user; and
   the controller is configured to control the backlight panel to illuminate the alphanumeric element more dimly than portions of the image away from the alphanumeric element.

4. The system of claim 2, wherein:
the informational element requests attention from a user; and
the controller is configured to control the backlight panel to illuminate the informational element more brightly than portions of the image away from the informational element.

5. The system of claim 4, wherein the informational element includes a prompt for an action by the user.

6. The system of claim 5, wherein the display panel is touch-sensitive, and the prompt requests that the user respond to the prompt on the touch-sensitive display panel.

7. The system of claim 4, wherein the controller is further configured to control the backlight panel to pulse the illumination of the informational element.

8. The system of claim 1, further comprising at least one sensor configured to sense an ambient light level, wherein the controller is configured to control the backlight panel to adjust an illumination level of at least a portion of the backlight panel in response to the sensed ambient light level.

9. The system of claim 8, wherein the at least one sensor includes a plurality of sensors positioned around a perimeter of the display panel.

10. The system of claim 1, wherein a number of pixels in the multi-pixel display panel is greater than a number of elements in the multi-element backlight panel.

11. The system of claim 1, wherein the backlight panel includes a two-dimensional array of independently controllable light emitting diodes.

12. A method, comprising:
displaying an image on a multi-pixel display panel, the image including an informational element;
backlighting the display panel with a multi-element backlight panel;
determining whether an area of the display panel is positioned in sunlight; and
controlling the backlight panel to illuminate the informational element more brightly or more dimly than portions of the image away from the informational element, wherein controlling the backlight panel includes modifying a driving signal sent to the backlight panel, such that during operation, the backlight panel has a first non-zero illumination level proximate the informational element and a second non-zero illumination level different from the first non-zero illumination level away from the informational element, wherein the illumination of the informational element includes to pulse the illumination of the informational element, and wherein to pulse the illumination of the informational element includes at least one of a ramp up to an elevated illumination level or a ramp down from the elevated illumination level, and wherein upon the determining that an area of the display panel is positioned in sunlight, brightening only the area of the display panel positioned in sunlight.

13. The method of claim 12, wherein the informational element includes at least one of an alphanumeric element or a graphical element.

14. The method of claim 13, wherein:
the informational element includes an alphanumeric element;
the alphanumeric element includes personal information of a user; and
the backlight panel is controlled to illuminate the alphanumeric element more dimly than portions of the image away from the alphanumeric element.

15. The method of claim 13, wherein:
the display panel is touch-sensitive;
the informational element includes a prompt that requests that the user respond to the prompt on the touch-sensitive display panel; and
the backlight panel is controlled to illuminate the informational element more brightly than portions of the image away from the informational element.

16. The method of claim 13, further comprising:
sensing an ambient light level with a plurality of sensors positioned around a perimeter of the display panel; and
controlling the backlight panel to adjust an illumination level of at least a portion of the backlight panel in response to the sensed ambient light level.

17. The method of claim 13, wherein:
a number of pixels in the multi-pixel display panel is greater than a number of elements in the multi-element backlight panel; and
the backlight panel includes a two-dimensional array of independently controllable light emitting diodes.

18. A system, comprising:
a multi-pixel display panel configured to display an image that includes an alphanumeric element;
a multi-element backlight panel configured to backlight the display panel, the backlight panel including a two-dimensional array of independently controllable light emitting diodes, wherein a number of pixels in the multi-pixel display panel is greater than a number of light emitting diodes in the multi-element backlight panel;
at least two sensors located around a perimeter of the display panel configured to determine whether an area of the display panel is positioned in sunlight; and
a controller coupled to the display panel and the backlight panel, the controller configured to control the backlight panel to illuminate the alphanumeric element more brightly or more dimly than portions of the image away from the alphanumeric element, wherein to control the backlight panel includes to modify a driving signal sent to the backlight panel, such that during operation, the backlight panel has a first non-zero illumination level proximate the informational element and a second non-zero illumination level different from the first non-zero illumination level away from the informational element, wherein the illumination of the informational element includes to pulse the illumination of the informational element, and wherein to pulse the illumination of the informational element includes at least one of a ramp up to an elevated illumination level or a ramp down from the elevated illumination level, and wherein upon a determination that an area of the display panel is positioned in sunlight, the controller is to brighten only the area of the display panel positioned in sunlight.

19. The system of claim 18, wherein:
the alphanumeric element includes personal information of a user; and
the controller is configured to control the backlight panel to illuminate the alphanumeric element more dimly than portions of the image away from the alphanumeric element.

20. The system of claim 18, wherein:
the display panel is touch-sensitive;
the alphanumeric element includes a prompt that requests that a user respond to the prompt on the touch-sensitive display panel; and the controller is configured to control the backlight panel to illuminate the alphanumeric element more brightly than portions of the image away from the alphanumeric element.

* * * * *